US011902036B2

United States Patent
Ding et al.

(10) Patent No.: US 11,902,036 B2
(45) Date of Patent: Feb. 13, 2024

(54) POLICY AND CHARGING CONTROL (PCC) IN INFORMATION CENTRIC NETWORKING

(71) Applicant: Apple Inc., Cupertino, CA (US)

(72) Inventors: Zongrui Ding, Portland, OR (US); Gabriel Arrobo Vidal, Hillsboro, OR (US); Qian Li, Beaverton, OR (US); Geng Wu, Portland, OR (US)

(73) Assignee: Apple Inc., Cupertino, CA (US)

( * ) Notice: Subject to any disclaimer, the term of this patent is extended or adjusted under 35 U.S.C. 154(b) by 494 days.

(21) Appl. No.: 17/284,448

(22) PCT Filed: Nov. 1, 2019

(86) PCT No.: PCT/US2019/059410
§ 371 (c)(1),
(2) Date: Apr. 10, 2021

(87) PCT Pub. No.: WO2020/092914
PCT Pub. Date: May 7, 2020

(65) Prior Publication Data
US 2021/0359871 A1 Nov. 18, 2021

Related U.S. Application Data

(60) Provisional application No. 62/755,150, filed on Nov. 2, 2018.

(51) Int. Cl.
*H04L 12/14* (2006.01)
*H04W 4/24* (2018.01)

(52) U.S. Cl.
CPC .......... *H04L 12/1407* (2013.01); *H04W 4/24* (2013.01)

(58) Field of Classification Search
CPC .......................... H04L 12/1407; H04W 4/24
(Continued)

(56) References Cited

U.S. PATENT DOCUMENTS 9,942,831 B2 * 4/2018 Laraqui ............... H04W 88/02
2018/0007177 A1 1/2018 Suthar et al.

FOREIGN PATENT DOCUMENTS

KR 10-1699679 B1 1/2017
WO 2018044213 A1 3/2018
WO WO-2018044213 A1 * 3/2018 ............. H04L 67/18

OTHER PUBLICATIONS

R. Ravindran et al., "Enabling ICN in 3GPP's 5G NextGen Core Architecture—draft-ravi-icnrg-5gc-icn-01", IETF, Feb. 2018, 10 pgs.

(Continued)

*Primary Examiner* — Ahmad F. Matar
*Assistant Examiner* — Jirapon Tulop
(74) *Attorney, Agent, or Firm* — Kowert, Hood, Munyon, Rankin & Goetzel, P.C.

(57) ABSTRACT

Systems and methods of providing policy and charging control in an information-centric network are described. An interest packet is transmitted from a content consumer to a holder through a gNB, ICN-PoA and ICN-GW. The interest packet has a prefix identifying content to be retrieved and a type field indicating an interest packet. The ICN-PoA modifies the interest packet to include a type of service (TS) field having the identity of the consumer and then transmitted to the ICN-GW when the content is neither created nor cached inside the 5G network. A data packet that includes the prefix, a type field indicating a data packet and the TS field is returned from the ICN-GW. The data packet is modified by the ICN-PoA to remove the TS field and transmitted to the consumer. The interest and data packets are logged and reported to an ICN-CF for generation of charging records.

18 Claims, 12 Drawing Sheets

(58) Field of Classification Search
USPC .......................................................... 370/259
See application file for complete search history.

(56) References Cited

OTHER PUBLICATIONS

"System Architecture for the 5G System; Stage 2", Release 15, 3GPP TS 23.501, v15.3.0, Sep. 2018, 226 pgs.
R. Ravindran et al., "Enabling ICN in 3GPP's 5G NextGen Core Architecture—draft-ravi-icnrg-5gc-icn-01", IETF, Feb. 2018, 14 pgs.
International Search Report and Written Opinion for International Application No. PCT/US2019/059410, dated Feb. 26, 2020, 10 pgs.

\* cited by examiner

POLICY AND CHARGING CONTROL (PCC) IN INFORMATION CENTRIC NETWORKING

This application is a U.S. National Stage filing of International Application No. PCT/US2019/059410, filed Nov. 1, 2019, which claims the benefit of and priority to the U.S. Provisional Application No. 62/755,150, filed Nov. 2, 2018. All of the aforementioned applications are incorporated herein by reference in their entireties.

TECHNICAL FIELD

Embodiments pertain to radio access networks (RANs). Some embodiments relate to cellular networks, including Third Generation Partnership Project (3GPP) Long Term Evolution (LTE), $4^{th}$ generation (4G) and $5^{th}$ generation (5G) New Radio (NR) (or next generation (NG)) networks. Some embodiments relate to Policy and Charging Control (PCC) in NG networks.

BACKGROUND

The use of various types of systems has increased due to both an increase in the number and types of user equipment (UEs) using network resources as well as the amount of data and bandwidth being used by various applications, such as video streaming, operating on these UEs. Bandwidth, latency, and data rate enhancement may be used to deliver the continuously-increasing demand for network resources. The next generation wireless communication system will provide ubiquitous connectivity and access to information, as well as ability to share data, by various users and applications. NG systems are expected to have a unified framework in which different and sometimes conflicting performance criteria and services are to be met. For example, generation, collection and management of charging record information may differ from methodology used in 4G systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
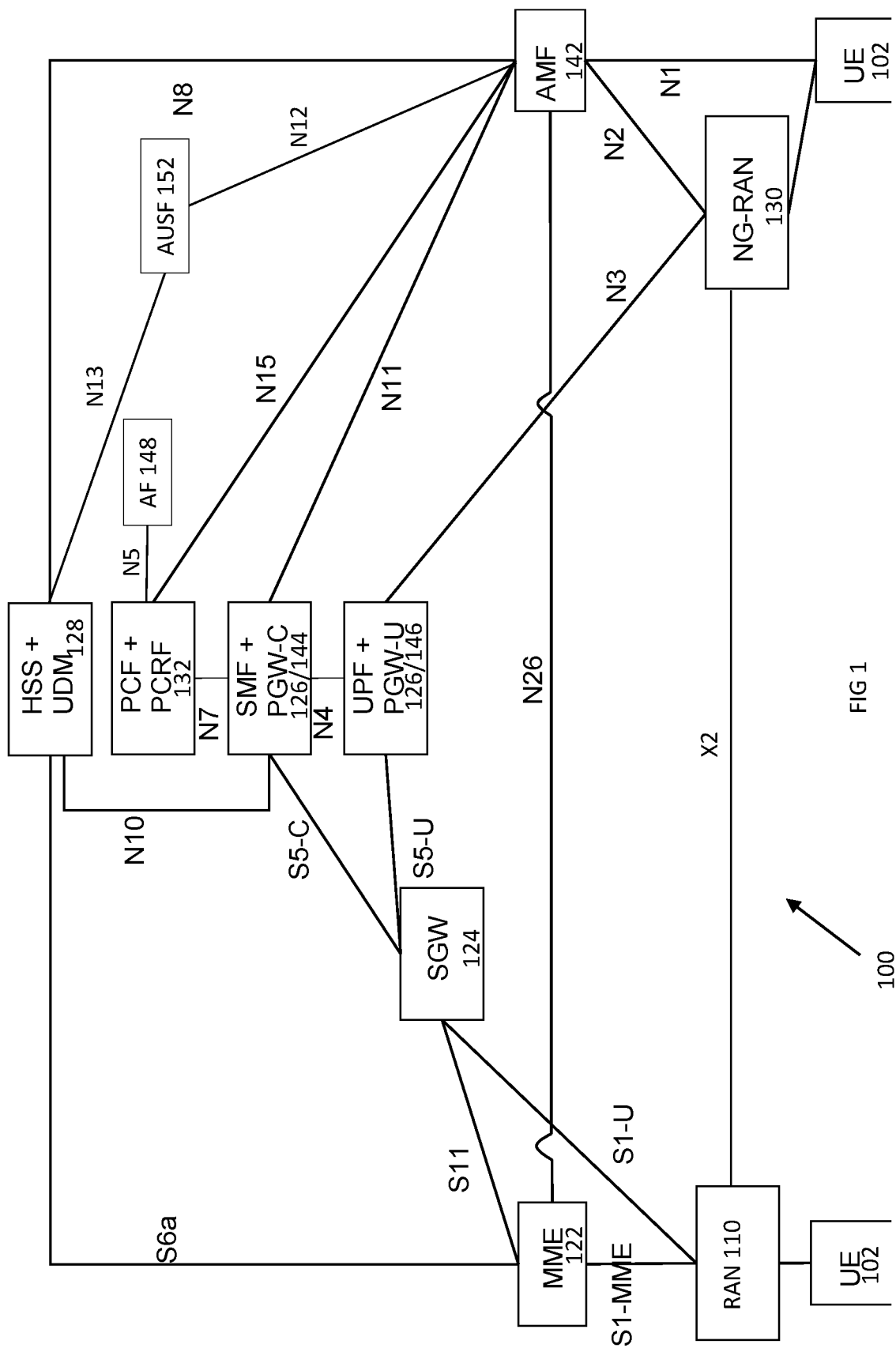
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or radio access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
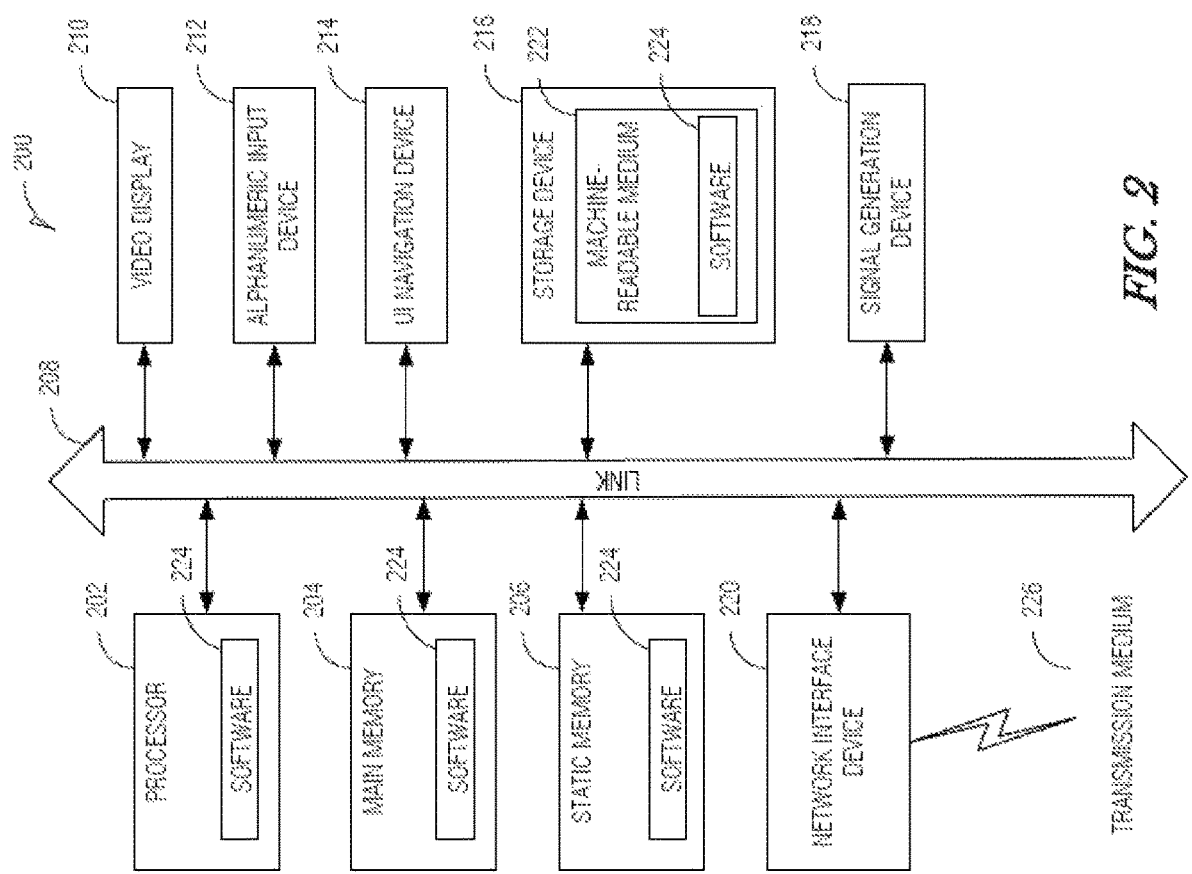
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the 4G/LTE or NG network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication-based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), a narrowband IoT (NB-IoT) device, or a non-IoT device (e.g., smart phone, vehicular UE), any which may communicate with the core network via the eNB or gNB shown in FIG. 1. The communication device 200 may be an autonomous or semiautonomous device that performs one or more functions, such as sensing or control, among others, in communication with other communication devices and a wider network, such as the Internet. If the communication device 200 is IoT device, in some embodiments, the communication device 200 may be limited in memory, size, or functionality, allowing larger numbers to be deployed for a similar cost to smaller numbers of larger devices. The communication device 200 may, in some embodiments, be a virtual device, such as an application on a smart phone or other computing device.

The 5G networking architecture is based on IP to transport IP, Ethernet and non-IP packets. That is, communication is host-to-host and content delivery relies on sessions between two end points (protocol data unit (PDU) sessions inside the cellular network and, typically, TCP sessions between client and server). The maintenance of these end-to-end sessions may be complex and error-prone. Additionally, bottlenecks can be created anywhere in the network because multiple users might be requesting the same content without the network having any knowledge of the multiple requests, causing a non-optimal utilization of the link resources. Moreover, inside the network (core network and/or data network), it may be impossible to share the content among different users requesting the same content.

To combat this, Information Centric Networking (ICN) may be used. ICN works in a pull-based model, where two types of packets are defined: an interest packet and a data packet. An interest packet (request) may flow from a consumer (e.g., a laptop or smartphone) through an access point and content router(s) to a producer, with the data packet (response) traversing the path in the opposite direction. ICN is based on a data structure that includes a Pending Interest Table (PIT), Forward Information Base (FIB), and Content Store (CS). ICN may also use interest forwarding strategies which take input from both FIB and network/device measurements to make interest forwarding decisions.

With more specificity, the requestor (consumer/client) may send an interest packet with an indicator (e.g., a prefix) to identify the desired content (e.g., by the name of the content). The Uniform Resource Identifier (URI) is widely used to name the resources, which is constructed based on a naming convention. Each of the forwarding nodes may check the prefix of the interest packet and reply with a data packet that matches the prefix (if the forwarding node has the data in its cache). If there is no match, based on its FIB table, the forwarding node can forward the interest to one or more other nodes. The interest packet can also reach the source (producer/server) and obtain the data packet from the source. Multi-homing and multicast may be automatically enabled if there is more than one node that can act as a source (producer/server) or more than one consumer requesting the same content. The ICN request/response mechanism is different from an end-to-end session (e.g., TCP connection), being session-less and anchor-less, which leverages arbitrarily available caching and automatically incorporates content-related routing. ICN may be a session-less protocol in which a consumer (client) requests content (e.g., a chunk of data) to the network and data is retrieved from wherever the content is in the network. Accordingly, ICN brings application layer optimizations down to the networking layer. That is, functionalities that were previously implemented in the application layer such as Edge Computing (caching), are naturally supported by ICN in the network layer (L3).

ICN packets may be constructed in a Type-Length-Value (TLV) format. The prefix value may be generally the "name" to identify a content, although another type of indicator may be used. The type field of an outer TLV can indicate whether the ICN packet is an interest packet or data packet.

The current 5G architecture may be designed to follow the Control and User Plan Split (CUPS). Some features have been defined, such as Network Slicing (NS), Ultra-Reliable and Low Latency Communication (URLLC), X as a Service (XaaS), among others. The 5G network may, however, still follow a communication model where the UE sends IP (and/or Ethernet and/or Non-IP) packets to the data network (DN) through sessions (e.g., PDU sessions). On the data plane, the User Plane Function (UPF) in the 5G system or the Packet Data Network Gateway (P-GW) in the 4G system may serve as an anchor and interact with other Core Network (CN) entities to handle sessions.

In the 5G architecture, PCC is based on PDU sessions and the mechanisms are described in 3GPP Technical Specification 23.501 and 3GPP Technical Specification 32.240. When a PDU session for a UE is set up, the PCC related network entities may obtain knowledge of the other end point, anchor UPF, QoS related information, traffic type and applied charging rules. The UPF may then monitor the traffic, apply the appropriate policies and report charging related information to Session Management Function (SMF) and Policy Control Function (PCF) to generate charging records.

The ICN protocol stack, however, may be content oriented and store the state of the request (e.g., PIT) and routing (e.g., FIB) on a per-hop basis. The named content may also be stored in a distributed way at different ICN nodes without notifying the clients (consumers) which entity has what information. For native ICN, when a UE sends an interest packet to request a given content, the network may not know where the content could come from or which node the interest packet would arrive or pass by. The interest packet might not even need to go out of the cellular network if a copy of the requested data is already cached inside the CN.

Therefore, ICN has a different communication model compared to a PDU session. The information about ICN events used for policy (e.g., whether or not to drop a particular interest or data packet) and charging may be stored in a distributed manner in the ICN nodes (inside the network).

In some embodiments, the current architecture and PCC procedure similar to 3GPP Technical Specification 32.240 may be reused to collect and manage this information in the 5G architecture. However, this PCC scheme is still based on PDU sessions having the UPF as an anchor to monitor the ICN packets and report ICN information to SMF. Thus, the ICN content is changed based on transporting packets through a predefined path via tunnels (ICN packets encapsulated into IP packets), which may not allow data caching in the network, and may thus be inefficient.

Figure 3:
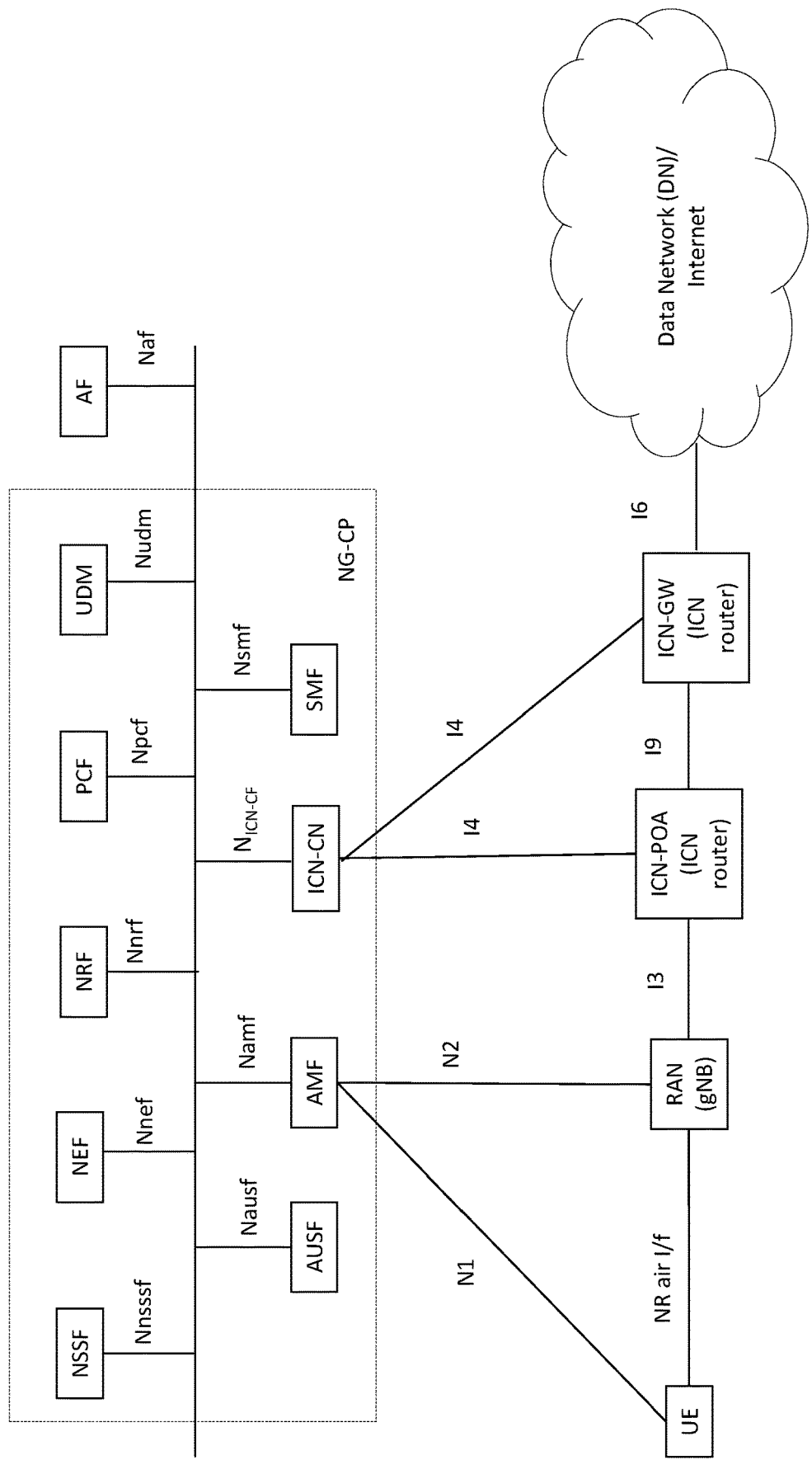
FIG. 3 illustrates an information-centric networking (ICN) 5G architecture in accordance with some embodiments.

Some embodiments may instead use different PCC mechanisms to collect ICN event information. FIG. 3 illustrates an information-centric networking (ICN) 5G architecture in accordance with some embodiments. The architecture shown in FIG. 3 may enable ICN PCC in the next generation cellular networks. In one PCC mechanism, the ICN Point of Attachment (ICN-PoA) and ICN Gateway (ICN-GW) are two entities that i) report ICN event information to ICN Control Function (ICN-CF) to generate charging records for ICN and ii) receive from ICN-CF information about rules and policies to be applied to ICN traffic. In another PCC mechanism described herein, a Type of Service (TS) may be assigned to identify the PCC information such as UE's ID, UE's role in the ICN event (producer or consumer), among others. The ICN-PoA can add the TS field(s) to the ICN packets that traverse the cellular network for PCC functionality. The ICN-GW may remove the TS field(s) from the packets before the packets leave the cellular network.

The new functional entities (ICN-CF, ICN-PoA, ICN-GW) shown in FIG. 3 may enable ICN in NG cellular networks from the perspective of exchanging ICN related information in the network. The ICN-PoA may serve as the first ICN-aware user plane entity for UEs running ICN applications and the ICN-GW may be a user plane ICN entity that interfaces with the DN, which may also support ICN-based schemes. The ICN-GW and the UPF PDU Session Anchor (PSA) may, in some embodiments, be in the same entity. That is, an ICN-UPF entity could be instantiated, where the functionality of the ICN-GW could be part of (or combined with) the UPF (PSA). The ICN-CF may handle the ICN related information and policy and generate ICN transaction history among other ICN related functionalities. These entities may be functional entities and can be incorporated within existing 5GC entities for flexibility. As used herein, transmissions between various entities may include encoding at the transmitting entity and decoding at the receiving entity.

PROCEDURES

Embodiment 1: I4 Based PCC Mechanism

For this PCC mechanism, the UE may support the ICN stack or both ICN and IP as L3 protocol. The UE may have registered an ICN service with the CN and the ICN-PoA/ICN-CF have been assigned. The gNB serving the UE may have downloaded, through the AMF, the ICN-related context information such as the assigned ICN-PoA and policies to handle the ICN packets. There may be additional procedures between the ICN-CF and PCF if the ICN policies are stored in the PCF. The ICN packets may be considered as data plane traffic. The ICN packets traversing the cellular network may remain unaltered (not modified) by ICN nodes, i.e., ICN-PoA, ICN-GW and ICN routers inside the core network may not add or remove any field. The interface I3 between the gNB and the ICN-PoA, can be based on different protocols such as IP, tunneling protocol (e.g., GTP), Ethernet, or others to exchange packets.

The ICN-PoA may have the knowledge of which UE has sent an ICN packet. Several ways may exist to achieve this knowledge transfer between the gNB and the ICN-PoA. For example, the gNB can collocate with the ICN-PoA and share information to differentiate UEs. Alternatively, the protocol between the gNB and the ICN-PoA may be tunneling and the tunnel ID can be used to differentiate UEs. In another alternative, the ICN-PoA may create a face (logical interface) for each UE. The manner in which the gNB passes detailed information about the UEs and the transmitted ICN packets is described further below.

Figure 4:
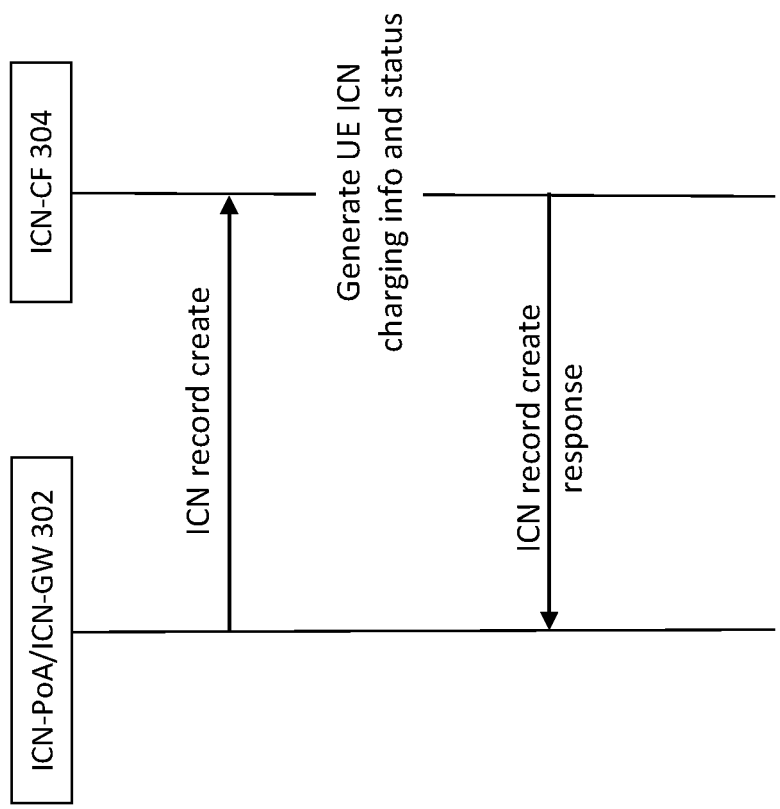
FIG. 4 illustrates an ICN event reporting procedure in accordance with some embodiments.

FIG. 4 illustrates an ICN event reporting procedure in accordance with some embodiments. It will be apparent that FIG. 4 is merely an example, and other embodiments may modify or omit some operations shown in FIG. 4, include additional operations not shown in FIG. 4, and/or perform operations in a different order as appropriate. The ICN-PoA 402 serving as the first ICN point of contact, may log the ICN data rate or ICN events of a UE and apply UE specific filter(s)/policies for ICN traffic. The ICN-GW 402, as the interface to the DN, may log the prefix related ICN events and apply filter(s)/policies for content (data packets). The reporting procedure over I4 between the ICN-PoA 402 and ICN-CF 404 as well as the ICN-GW 402 and ICN-CF 404 can be triggered by specific events or based on a schedule, i.e., a defined period. Since the ICN-PoA 402 and ICN-GW 402 are functional entities, they can be collocated in existing entities for implementation. For example, if the ICN-PoA 402, ICN-GW 402 and ICN-CF 404 are standalone entities, the reporting produce is over I4. Or the ICN-PoA and ICN-GW 402 can be collocated with UPFs. In this case, the procedure can be over an existing interface, such as an N4.

As shown in FIG. 4, specifically, ICN-PoA and ICN-GW 402 may generate event records based on the ICN packets and send an ICN record create request to the ICN-CF 404. The ICN-CF 404 may generate the UE's ICN related charging and policy information based on the reported ICN events. The ICN-CF 404 can adjust ICN policies for a UE based on the record. The ICN-CF 404 may provide responses to the ICN-PoA/ICN-GW 402 indicating the applied/adjusted PCC rules.

Figure 5:
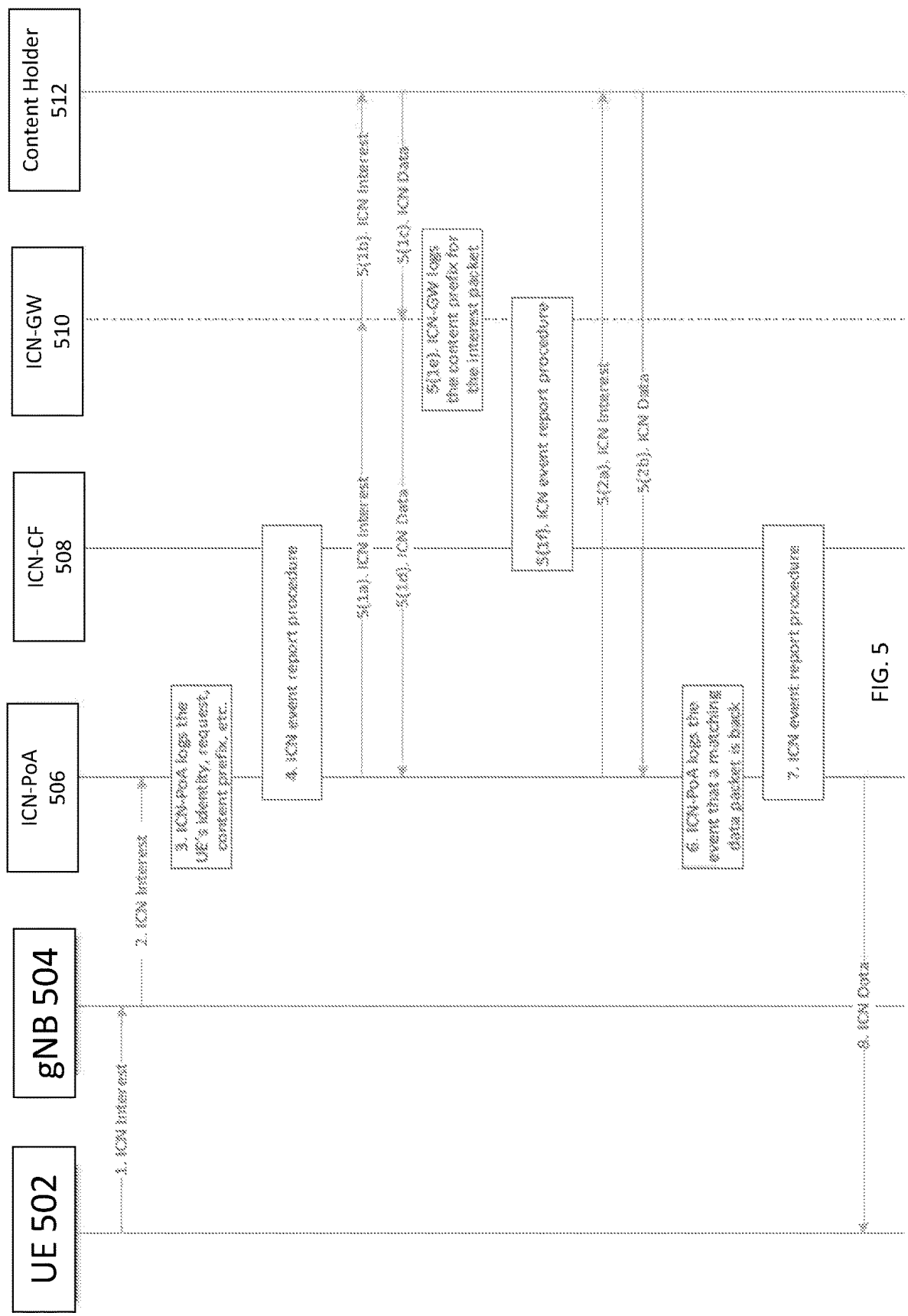
FIG. 5 is an ICN PCC procedure in accordance with some embodiments.

FIG. 5 is an ICN PCC procedure in accordance with some embodiments. It will be apparent that FIG. 5 is merely an example, and other embodiments may modify or omit some operations shown in FIG. 5, include additional operations not shown in FIG. 5, and/or perform operations in a different order as appropriate. In particular, FIG. 5 illustrates a procedure for a UE 502 requesting content as an ICN consumer. The content (data) can be located in the source node (creator of the content) 512 or in any node that has a cached copy of the data, and this data can be inside or outside the cellular network. The various entities between the content requester (UE 502) and the content creator 512 include the gNB 504, the ICN-POA 506, the ICN-CF 508, and the ICN-GW 510. In some embodiments, the ICN-CF 508 may be collocated with the AMF or SMF and the ICN-GW 510 can be an additional function of a UPF. The ICN-PoA 506 can be collocated with a gNB or, as shown, can be in a standalone entity to serve more than one gNB.

As shown in FIG. 5, the UE 502 may send an ICN Interest packet to the gNB 504 at operation 1. The gNB 504 may identify the ICN traffic and may send the ICN traffic to the assigned ICN-PoA 506 over I3. For simplicity, the message is transported as an ICN interest packet at operation 2. However, other protocols can be used to transport the message. The ICN-PoA 506 may log the UE's identity, the prefix information, and other relevant ICN-related information at operation 3. The ICN-PoA 506 may report aggregated ICN events to the ICN-CF 508 at operation 4. The frequency that the reports are sent may be based on different policies. One policy could be based on a defined period, based on report size, or based on number of events in the report, among others.

If the data is not created nor cached inside the cellular network various actions may occur. The ICN interest packet may arrive at an ICN-GW 510 at operation 5(1a). The ICN-GW 510 may forward the ICN interest packet to the DN at operation 5(1b). The ICN data packet may be returned to the ICN-GW 510 at operation 5(1c). The ICN data may traverse the ICN-GW 510 to be received at the ICN-PoA 506 at operation 5(1d). The ICN-GW 510 may generate logs for the interest packets and data packets at operation 5(1e). The ICN events logs may be reported to the ICN-CF 508 at operation 5(1f) following the procedure shown in FIG. 5.

On the other hand, if the data is created or a copy of the data is already cached inside the cellular network, the ICN interest packet may not go through an ICN-GW 510 but may instead reach the content or a cached copy of the data inside the cellular network at operation 5(2a). The ICN data packet may return at operation 5(2b) following the route of the interest packet to the ICN-PoA 506 as defined by native ICN protocols.

In either case, the ICN-PoA 506 may log the ICN events and match the prefix with the UEs' pending interest at operation 6. At operation 7, the ICN event logs may be reported to the ICN-CF 508 following the procedure shown in FIG. 5. The ICN data may then be sent through the gNB 504 to the UE 502 that requested the prefix/data.

Embodiment 2: gNB Based PCC Mechanism

In this case, the gNB may be the entity that keeps track and reports ICN events. This means that the functionalities of ICN-PoA and ICN-GW may be simplified compared to Embodiment 1. For this PCC mechanism, the UE may support the ICN stack only or both ICN and IP stacks. In this embodiment, the gNB and ICN-PoA can modify the ICN messages (interest and data). For example, one or more fields can be added to the ICN message in a TLV format. The gNB in this case may not support ICN, thus may not understand an ICN packet. ICN packets may be considered as data plane traffic.

In this PCC mechanism, a TS field may be defined to indicate PCC information and the content of this field assigned and managed by the ICN-CF. The TS can include the UE's identity (e.g., international mobile equipment identify (IMEI), international mobile subscriber identity (IMSI)); the UE's encrypted identity (e.g., encrypted IMEI, IMSI); an identifier for a group of UEs; UE charging rules; a combination of the above and/or other content, as well as perhaps QoS rules and priority. Note that the charging rules may be defined by the operator, and may include data rate and data size, among others.

Figure 6:
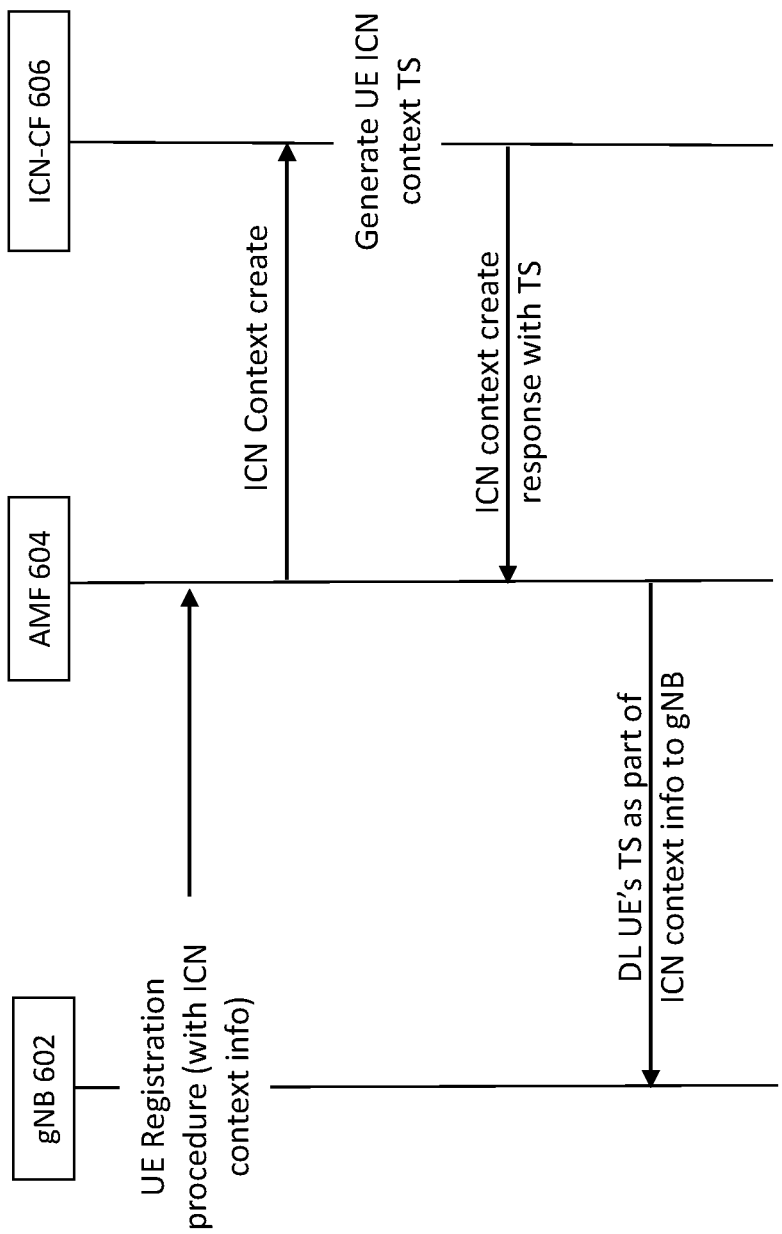
FIG. 6 is an ICN type of service (TS) assignment in accordance with some embodiments.

FIG. 6 is an ICN TS assignment in accordance with some embodiments. It will be apparent that FIG. 6 is merely an example, and other embodiments may modify or omit some operations shown in FIG. 6, include additional operations not shown in FIG. 6, and/or perform operations in a different order as appropriate. The TS may be allocated to a UE, and the gNB may retain the TS as part of the UE's ICN context information. As shown in FIG. 6, at operation 1, the UE may register, with the AMF 604, an indication for ICN service during the registration procedure and include the ICN context information. The AMF 604 may send the ICN context information to the ICN-CF 606. The ICN-CF 606 may generate the UE's ICN TS based on the UE's ICN context information. The ICN-CF 606 may also reject a TS assignment request based on the UE's information. The ICN-CF 606 may send the TS with the response to the AMF 604. The gNB 602 serving the UE may download the TS as part of the UE's context information from the AMF 604.

Figure 7:
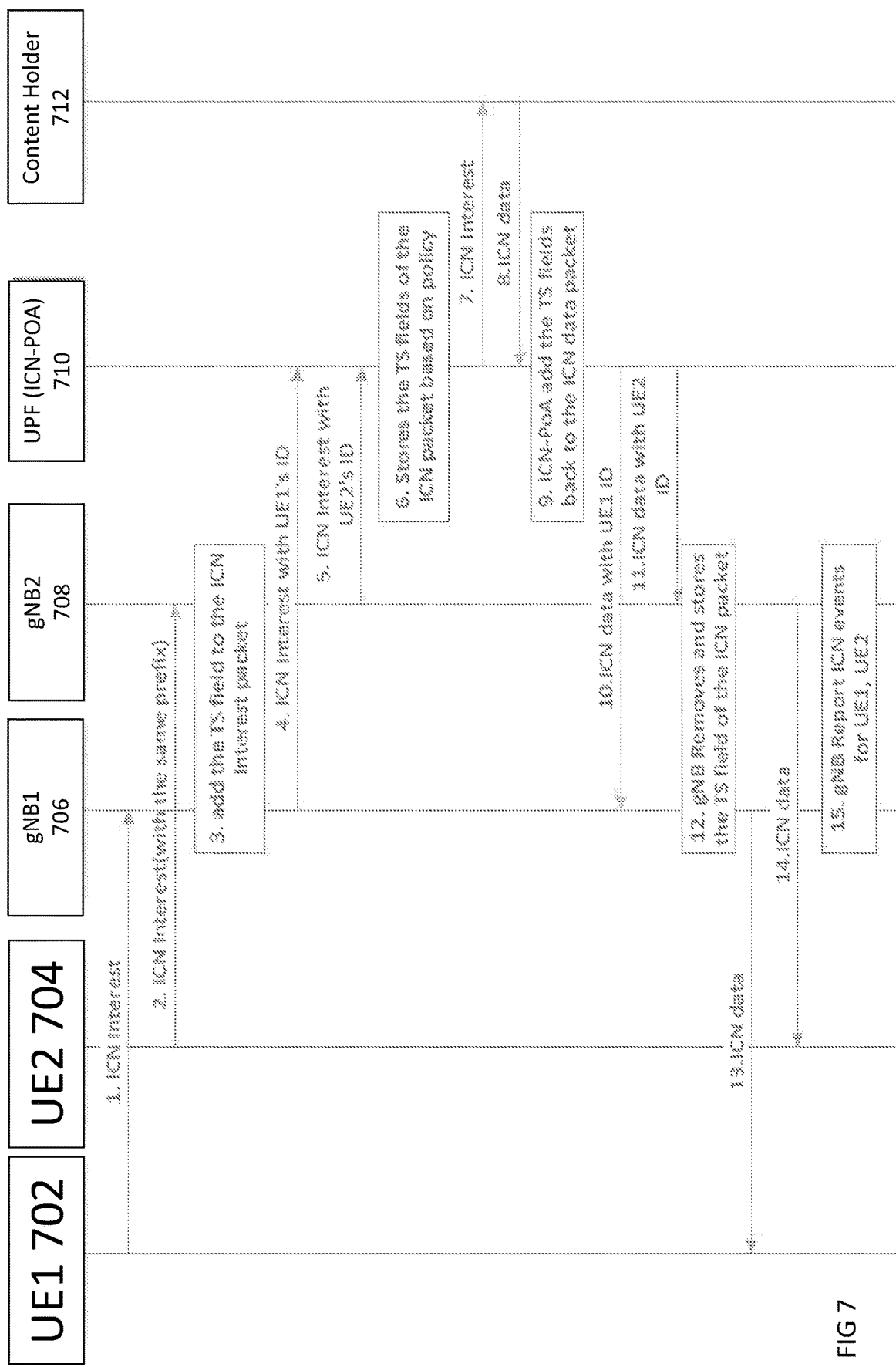
FIG. 7 is a TS-based PCC procedure in accordance with some embodiments.

FIG. 7 is a TS-based PCC procedure in accordance with some embodiments. In particular, FIG. 7 shows a procedure for tracking ICN activities using TS fields in gNBs. It will be apparent that FIG. 7 is merely an example, and other embodiments may modify or omit some operations shown in FIG. 7, include additional operations not shown in FIG. 7, and/or perform operations in a different order as appropriate. In some embodiments, the content holder 712 may be inside the CN and the same ICN-PoA 710 may be serving multiple gNBs (gNB1 706 and gNB2 708). To simplify the procedure, the TS field may be the UE's ID, so that when the ICN interest packets arrive at the ICN-PoA 710, the UE IDs can be aggregated and stored for the same prefix. When the data packets arrives, the data packets may follow the interest packet's route back to the consumer 702, 704. At the ICN-PoA 710, the stored UE's IDs may be added back to the data packet so that the gNB 706, 708 could report the data packet without understanding ICN.

As shown, at operation 1 UE1 702 may send an ICN interest packet with a prefix to an attached gNB (gNB1 706). In addition, UE2 704 may at operation 2 send an ICN interest packet, with the same prefix as UE1 (i.e., UE2 is requesting the same content as UE1), to UE2's gNB (gNB2 708). The gNB1 706 and gNB2 708 may identify the traffic as an ICN requests, and respectively add UE1's and UE2's TS field (UE's ID) to the interest packet at operation 3. The gNB1 706 may forward the ICN interest packet adding the TS field (e.g., UE1's ID) to the packet at operation 4. The gNB2 708 may likewise forward the ICN interest packet adding TS field (e.g., UE2's ID) to the packet at operation 5.

The ICN-PoA 710 may at operation 6 check the ICN packets and recognize the TS fields as UE IDs. Thus, the ICN-PoA 710 may store UE1's and UE2's IDs for the same prefix and remove the TS fields from the packets. When more than one UE is requesting data for the same prefix, only one interest packet may be sent out by the ICN node that received the multiple interest packets. This may be natively supported by ICN as Interest aggregation. In this way, an efficient use of the link resources is achieved.

The ICN-PoA 710 may at operation 7 send out an ICN interest packet without TS fields for the requested prefix. The ICN data may be provided at operation 8, following the same route as the ICN interest packet. The ICN data may arrive at the ICN-PoA 710.

The ICN-PoA 710 may at operation 9 check the prefix of the data and add back the UE1's and UE2's IDs to the ICN data packet. At operation 10, the ICN-PoA 710 may send the data to the gNB1 706 with UE1's ID and, at operation 11, the ICN-PoA 710 may send the data to the gNB2 708 with UE2's ID.

At operation 12 the gNBs 706, 708 may remove the UE's IDs from the ICN data packets. The gNBs 706, 708 may store the TS fields for future charging purposes. The gNB1 706 may send the ICN data packet to UE1 702 at operation 13. Similarly, the gNB2 708 at operation 14 may send the ICN data packet to UE2 704. At operation 15, the gNBs 706, 708 collect the TS field from the packet and report to the ICN-CF following the above procedure.

In Embodiment 1, it is assumed that the ICN-PoA can differentiate packets from different UEs and that knowledge can come from the ICN-CF through the control plane. The TS fields of the packets may also apply to Embodiment 1 if the ICN-PoA cannot different UEs.

Figure 8:
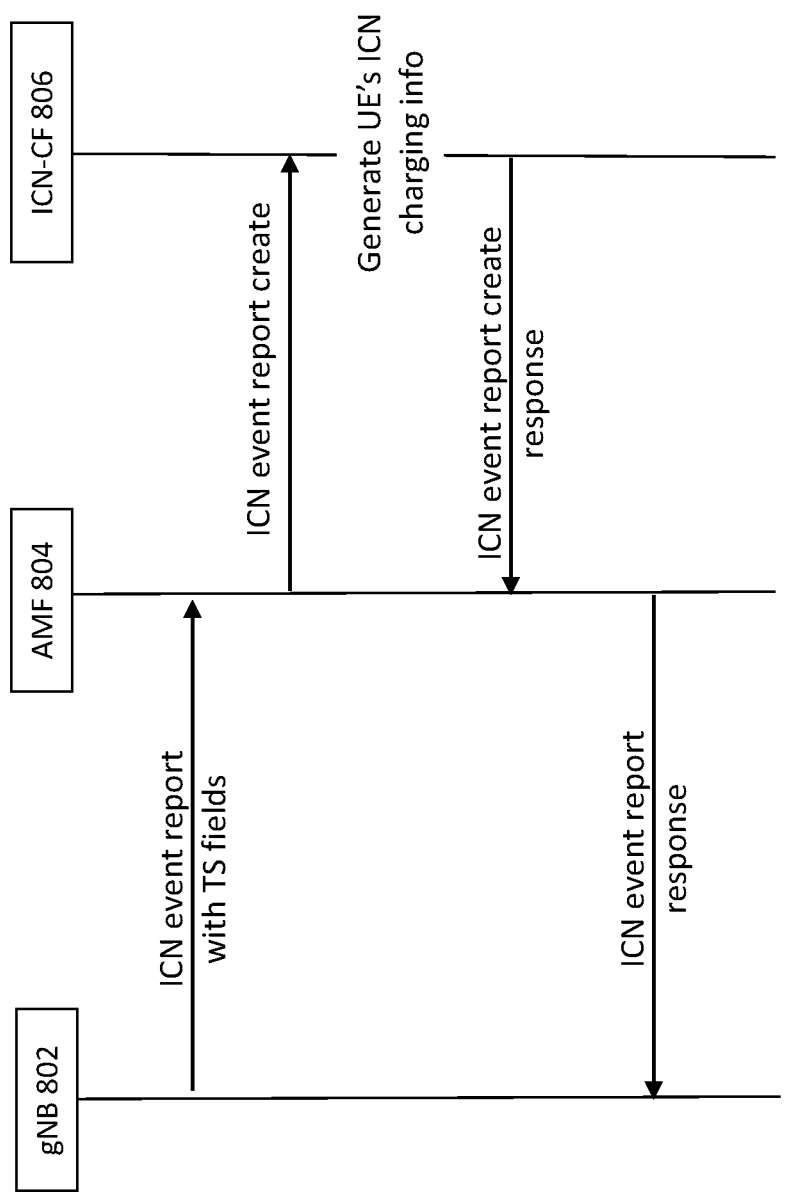
FIG. 8 is an ICN event report procedure in accordance with some embodiments.

FIG. 8 is an ICN event report procedure in accordance with some embodiments. It will be apparent that FIG. 8 is merely an example, and other embodiments may modify or omit some operations shown in FIG. 8, include additional operations not shown in FIG. 8, and/or perform operations in a different order as appropriate. As shown in FIG. 8, the gNB 802 can collect the TS fields of the ICN packets and report through the AMF 804 to the ICN-CF 806. For example, the gNB 802 could report the size of the ICN packet and the UE's identifier assuming the TS field is the UE's identifier. The reporting could be done in a per-packet basis (interest packet was satisfied with a data packet) or can be aggregated (content was satisfied).

The gNB 802 may collect the TS fields as well as other information (e.g., packet size) from the ICN packets and, when an interest is satisfied (i.e., a data packet was sent to the UE in response to an interest packet), the gNB 802 may report to the AMF 804 through N2. The AMF 804 may identify that the report is about ICN traffic and send the report through an ICN event report create message to the ICN-CF 806 through NICN-CF. The ICN-CF 806 may generate charging related information based on the ICN event report. The ICN-CF 806 may send an ICN event report create response (ACK) to the AMF 804. The AMF 804 may then send an ICN event report response to the gNB 802 to confirm the report.

If the UE is a producer, the ICN-PoA may add TS fields to the ICN interest packets before sending the ICN interest packets to the gNB 802. The gNB 802 may then remove the TS and report to the ICN-CF 806 through the AMF 804 following a similar procedure as that above.

Figure 9:
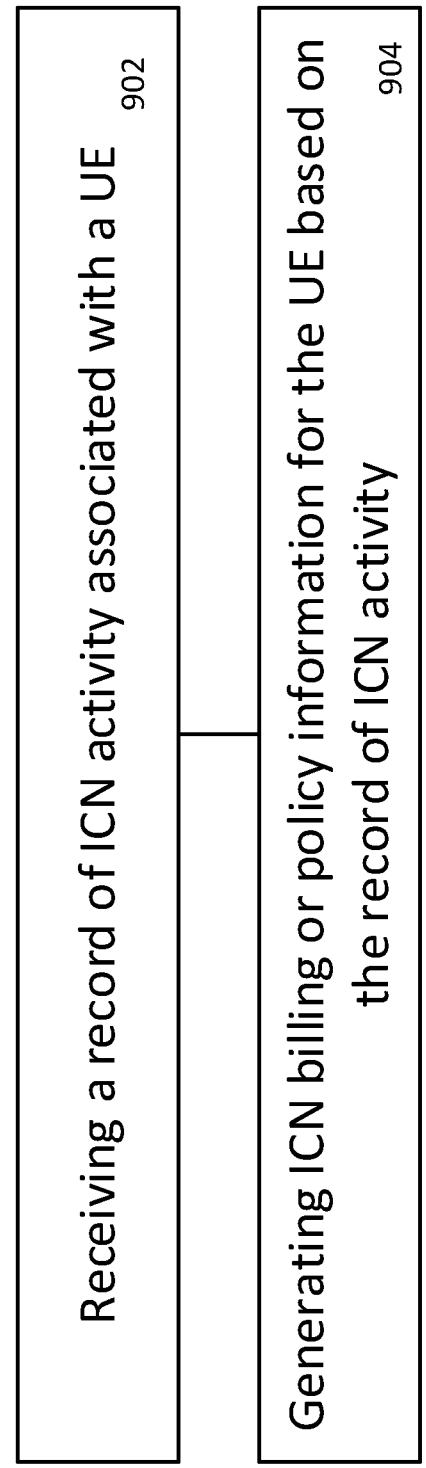
FIG. 9 is a method of generating ICN-related information in accordance with some embodiments.

FIG. 9 is a method of generating ICN-related information in accordance with some embodiments. It will be apparent that FIG. 9 is merely an example, and other embodiments may modify or omit some operations shown in FIG. 9, include additional operations not shown in FIG. 9, and/or perform operations in a different order as appropriate. Like the operations shown in FIGS. 10-12, the method of FIG. 9 may be undertaken by the various entities described above.

The method of FIG. 9 may include the ICN-CF receiving a record of ICN activity associated with a user equipment (UE) at operation 902. The ICN-CF may then at operation 904 generate ICN billing or policy information for the UE based on the record of ICN activity.

Figure 10:
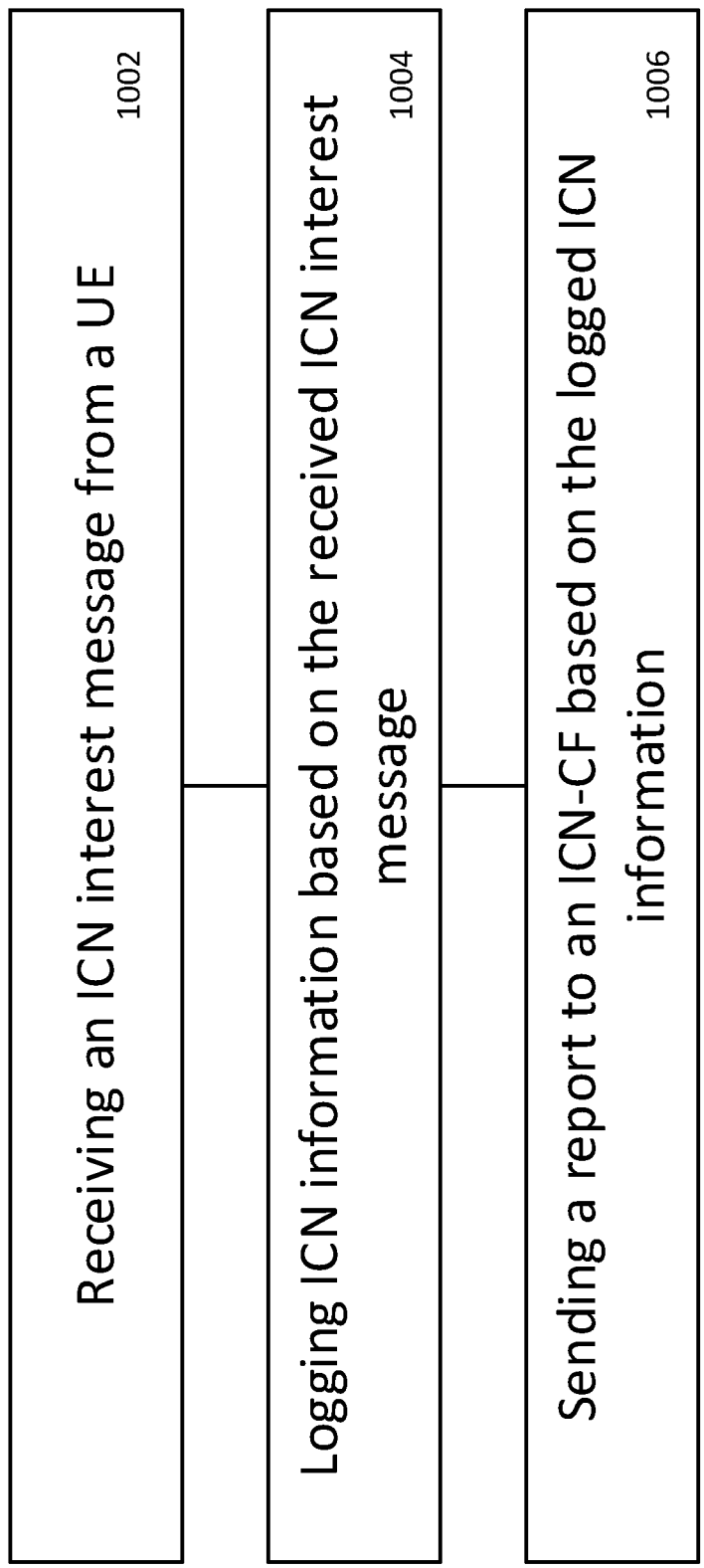
FIG. 10 is a method of ICN reporting in accordance with some embodiments.

FIG. 10 is a method of ICN reporting in accordance with some embodiments. As shown, at operation 1002, the ICN-PoA may receive an ICN interest message from a UE. The ICN-PoA may then at operation 1004 log ICN information based on the received ICN interest message. After logging the information, the ICN-PoA may at operation 1006 send a report to the ICN-CF based on the logged ICN information.

Figure 11:
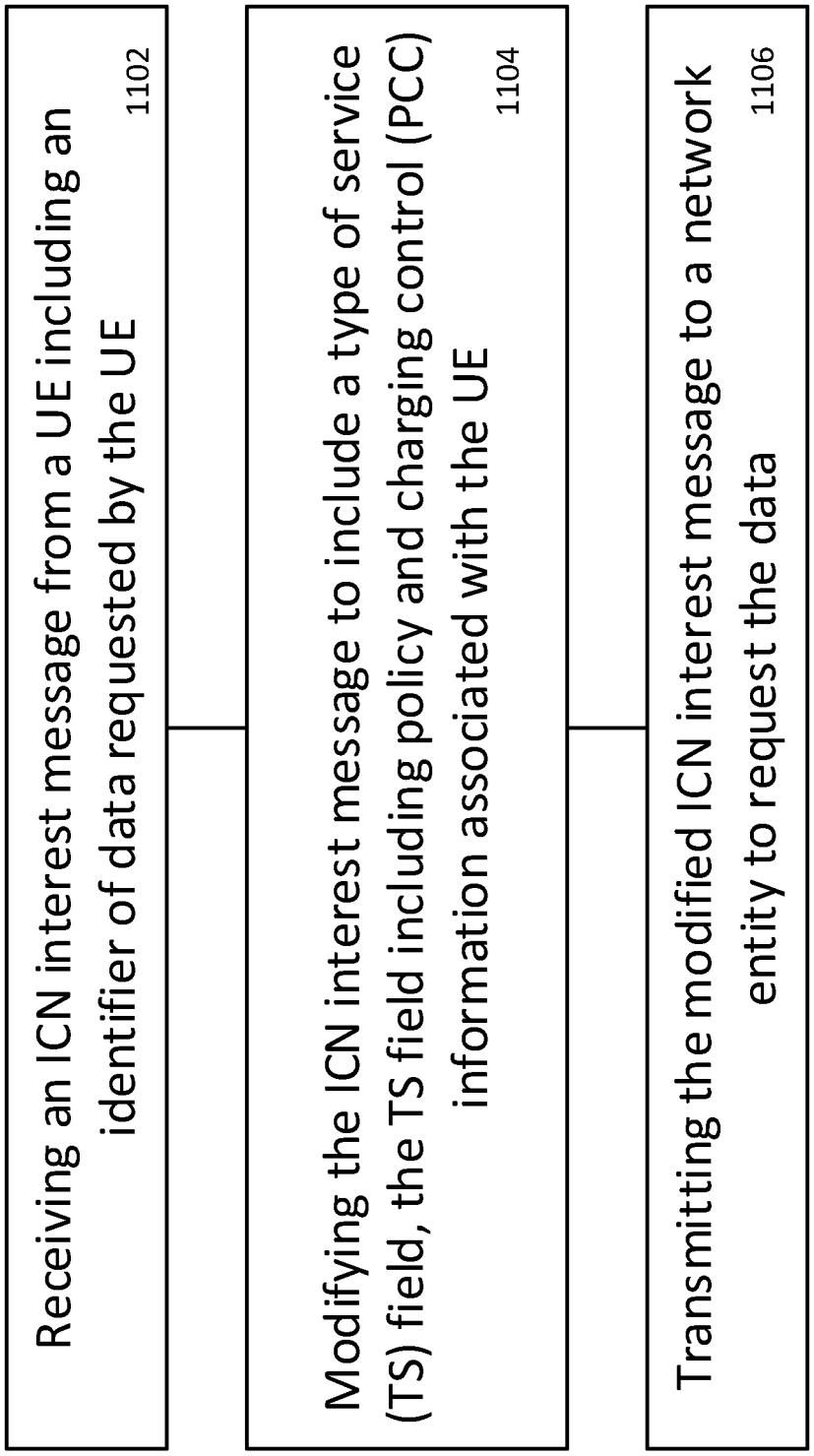
FIG. 11 is a method of ICN interest message transmission in accordance with some embodiments.

FIG. 11 is a method of ICN interest message transmission in accordance with some embodiments. As shown, at operation 1102, the gNB may receive an ICN interest message from a UE including an identifier of data requested by the UE. The gNB may then modify the ICN interest message to include a TS field at operation 1004. The TS field may include PCC information associated with the UE. At operation 1006, the gNB may transmit the modified ICN interest message to a network entity to request the data.

Figure 12:
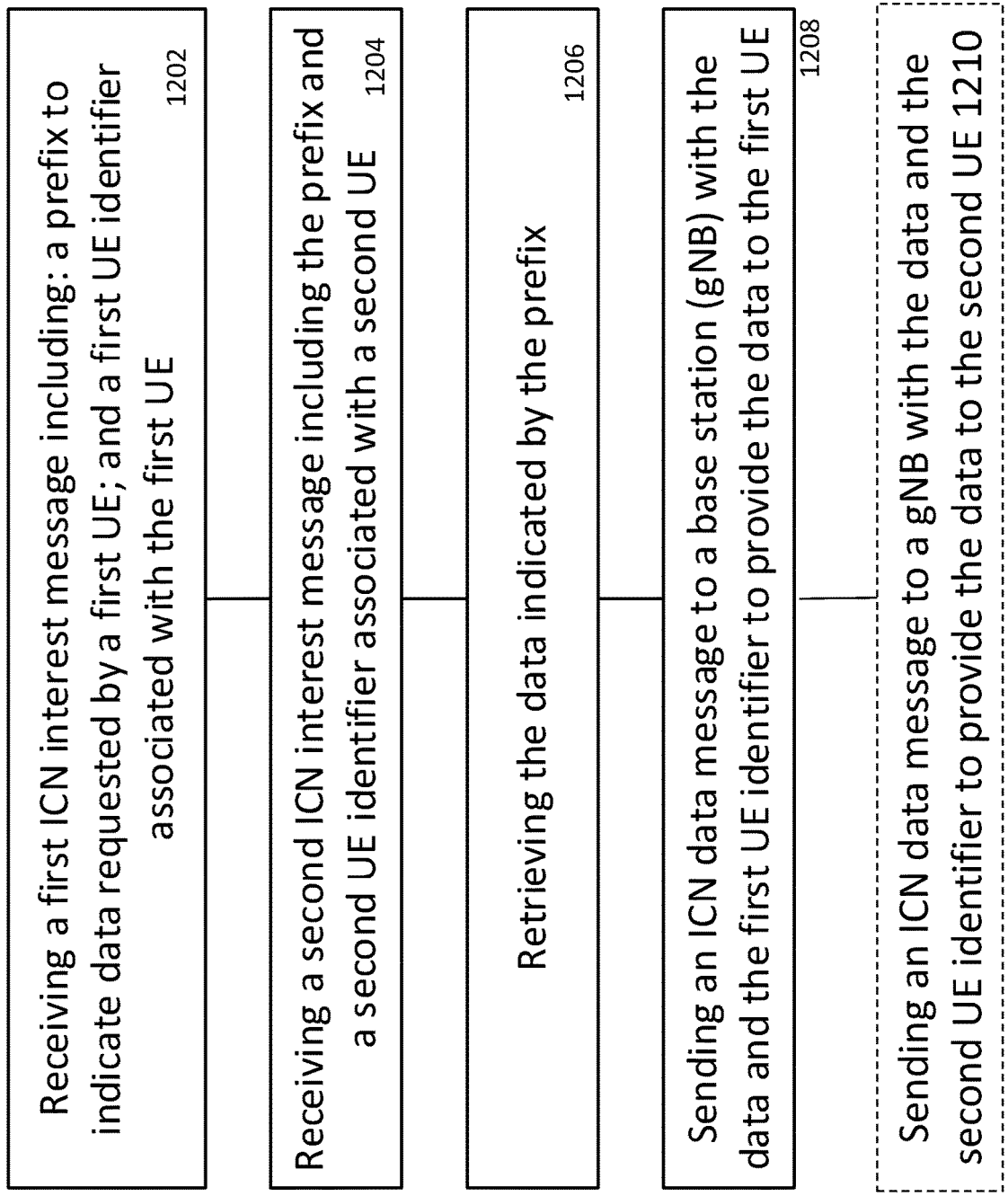
FIG. 12 is a method of ICN interest message transmission and response in accordance with some embodiments.

FIG. 12 is a method of ICN interest message transmission and response in accordance with some embodiments. As shown, at operation 1202, the ICN-PoA may receive a first ICN interest message from a first UE. The first ICN interest message may include a prefix to indicate data requested by the first UE and a first UE identifier associated with the first UE. At operation 1204, the ICN-PoA may receive a second ICN interest message from a second UE. The second ICN interest message may include the same prefix and a second UE identifier associated with the second UE. The second ICN interest message may be received before the data is retrieved by the ICN-PoA. The ICN-PoA may at operation 1206 retrieve the data indicated by the prefix. The ICN-PoA may send an ICN data message to a gNB with the data and the first UE identifier to provide the data to the first UE at operation 1208. Similarly, if the gNBs serving the first and second UEs are different, the ICN-PoA may send an ICN data message to the other gNB with the data and the second UE identifier to provide the data to the second UE at operation 1210. If the same gNB serves the first and second UEs, the ICN-PoA may send a separate ICN data message to the gNB with the data and the second UE identifier to provide the data to the second UE or may send a single ICN data message to the gNB with the data and the first and second UE identifiers to provide the data to the first and second UEs.

Thus, embodiments have been disclosed in which a PCC mechanism is based on an enhanced cellular architecture that includes an ICN-CF, ICN-GW and ICN-PoA. Procedures have been provided for the ICN-PoA/ICN-GW to report ICN-related events over I4 or existing interfaces like N4 and adjust policies instructed by the ICN-CF. Another PCC mechanism is provided in which an ICN-unaware gNB can report the ICN events using a TS fields of the ICN packets, as well as assignment of the TS fields to the ICN packets, checking the TS fields of the ICN packets, modification of the TS fields based on PCC policies, and collection of the TS fields from the ICN packets and reporting of ICN events to the ICN-CF.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus comprising:
at least one processor configured to cause an information-centric networking Point of Attachment (ICN-PoA) of a network to:
decode an ICN interest packet from a base station, the ICN interest packet comprising an indicator identifying content to be retrieved from a content holder for a user equipment (UE) and a type field indicating that the ICN interest packet is an interest packet;
determine that the content is neither created nor cached inside the network;
encode the ICN interest packet for transmission to an ICN gateway (ICN-GW) in response to a determination that the content neither created nor cached inside the network;
decode, in response to transmission of the ICN interest packet to the ICN-GW, an ICN data packet from the ICN-GW, the ICN data packet comprising another indicator identifying the content retrieved from the content holder and another type field indicating that the ICN data packet is a data packet; and
encode the ICN data packet for transmission to the UE.

2. The apparatus of claim 1, wherein the at least one processor is further configured to modify the ICN interest packet to include a type of service (TS) field, the TS field indicating the identity of the UE.

3. The apparatus of claim 2, wherein the TS field includes at least one of an international mobile equipment identify (IMEI) or international mobile subscriber identity (IMSI) of the UE, an encrypted identity of the UE, an identifier for a group of UEs that includes the UE, or UE charging rules.

4. The apparatus of claim 1, wherein the at least one processor is further configured to:
log ICN event information that comprises the identity of the UE and the indicator, the indicator being a prefix of the ICN interest packet and the other indicator being a prefix of the ICN data packet; and
generate, based on reception of the ICN interest packet, a report of the ICN event information for transmission to an ICN Control Function (ICN-CF) for generation of charging records.

5. The apparatus of claim 4, wherein the at least one processor is further configured to:
match the prefix of the ICN data packet with the prefix of the ICN interest packet; and
encode the ICN data packet for transmission to the UE and generate, based on matching of the prefix of the ICN data packet with the prefix of the ICN interest packet, another report of ICN event information for transmission to the ICN-CF.

6. The apparatus of claim 4, wherein the at least one processor is further configured to:
aggregate ICN events from the UE prior to transmission of the report to the ICN-CF, a frequency of transmission of reports based on at least one of a defined period, report size, or a number of events.

7. The apparatus of claim 4, wherein the at least one processor is further configured to:
decode, from the ICN-CF in response to transmission of the report, information about rules and policies to be applied to ICN traffic.

8. The apparatus of claim 1, wherein the at least one processor is further configured to:
determine the identity of the UE from a tunnel identifier with the base station.

9. The apparatus of claim 1, wherein the at least one processor is further configured to:
create a different logical interface with the base station for each UE.

10. The apparatus of claim 1, wherein:
the at least one processor is further configured to:
decode another ICN interest packet of another UE from another base station, the other ICN interest packet comprising another indicator and the type field indicating that the other ICN interest packet is the interest packet, the other indicator being the same as the indicator;
determine, prior to transmission of the ICN interest packet to a network entity, that the other indicator is the same as the indicator; and
remove a type of service (TS) field from the ICN interest packet and the other ICN interest packet, the TS field of the ICN interest packet indicating the identity of the UE and the TS field of the other ICN interest packet indicating the identity of the other UE,
the ICN interest packet transmitted to a network entity is for both the ICN interest packet and the other ICN interest packet, and
the ICN data packet received from a network entity is for both the ICN interest packet and the other ICN interest packet.

11. An apparatus comprising:
at least one processor configured to cause a base station to:
encode, for transmission to an Access and Mobility Function (AMF), registration of a user equipment (UE) that comprises information-centric networking (ICN) context information of the UE;
decode, from the AMF in response to transmission, an ICN type of service (TS) as part of the ICN context information, the ICN TS indicating UE charging rules and an identity of at least one of the UE or group of EEs comprising the EE;
decode an ICN interest packet from the EE, the ICN interest packet comprising a prefix identifying content to be retrieved from a content holder for the EE and a type field indicating that the ICN interest packet is an interest packet;
modify the ICN interest packet to include a TS field prior to transmission of the ICN interest packet to the ICN-PoA, the TS field indicating the identity of the EE; and
modify the ICN data packet to remove the TS field prior to transmission of the ICN data packet to the EE.

12. The apparatus of claim 11, wherein the at least one processor is further configured to:
encode the ICN interest packet for transmission to an ICN Point of Attachment (ICN-PoA);
decode, in response to transmission of the ICN interest packet to the ICN-PoA, an ICN data packet from the ICN-PoA, the ICN data packet comprising another prefix identifying the content retrieved from the content holder and another type field indicating that the ICN data packet is a data packet; and encode the ICN data packet for transmission to the EE.

13. The apparatus of claim 12, wherein the at least one processor is further configured to:

collect ICN event information that comprises the identity of the UE and packet size; and generate, based on reception of the ICN interest packet and the ICN data packet, a report of the ICN event information for transmission, through the AMF, to an ICN Control Function (ICN-CF) for generation of charging records.

14. The apparatus of claim 13, wherein the at least one processor is further configured to:

decode, in response to transmission of the report, an ICN event report response from the AMF to confirm generation of charging information related to the ICN interest packet and the ICN data packet.

15. The apparatus of claim 13, wherein the at least one processor is further configured to:

aggregate ICN events from the UE prior to transmission of the report to the ICN-CF, a frequency of transmission of reports based on at least one of a defined period, report size, or a number of events.

16. The apparatus of claim 12, wherein the at least one processor is further configured to:

remove a TS field prior to transmission of the ICN interest packet to the ICN-PoA if the UE is a producer, the TS field indicating the identity of the UE.

17. A non-transitory computer-readable storage medium that stores instructions for execution by one or more processors of an information-centric networking Point of Attachment (ICN-PoA) in network, the one or more processors to configure the ICN-PoA to, when the instructions are executed:

receive an ICN interest packet from a base station, the ICN interest packet comprising a prefix identifying content to be retrieved from a content holder for a user equipment (UE) and a type field indicating that the ICN interest packet is an interest packet;

modify the ICN interest packet to create a modified ICN interest packet, the modified ICN interest packet including a type of service (TS) field, the TS field indicating the identity of the UE;

determine the content is neither created nor cached inside the network;

transmit the modified ICN interest packet for transmission to an ICN gateway (ICN-GW) in response to a determination that the content is neither created nor cached inside the network;

receive, in response to transmission of the modified ICN interest packet to the ICN-GW, an ICN data packet from the ICN-GW, the ICN data packet comprising another prefix identifying the content retrieved from the content holder, another type field indicating that the ICN data packet is a data packet and the TS field;

modify the ICN data packet to remove the TS field and create a modified ICN data packet; and transmit the modified ICN data packet for transmission to the UE.

18. The medium of claim 17, wherein the one or more processors further configure the ICN-PoA to, when the instructions are executed:

log ICN event information that comprises the identity of the UE and the prefix;

match the prefix of the ICN data packet with the prefix of the ICN interest packet; and generate, based on matching of the prefix of the ICN data packet with the prefix of the ICN interest packet, a report of the ICN event information for transmission to an ICN Control Function (ICN-CF) for generation of charging records.

* * * * *